United States Patent
Bieswanger et al.

(10) Patent No.: US 8,612,793 B2
(45) Date of Patent: *Dec. 17, 2013

(54) DYNAMIC POWER AND PERFORMANCE CALIBRATION OF DATA PROCESSING SYSTEMS

(75) Inventors: Andreas Bieswanger, Boeblingen (DE); Thomas M. Brey, Raleigh, NC (US); Ajay Dholakia, Raleigh, NC (US); Andrew Geissler, Austin, TX (US); Hye-Young McCreary, Austin, TX (US); Freeman Leigh Rawson, III, Austin, TX (US); Malcolm Scott Allen-Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,706

(22) Filed: Jul. 16, 2012

(65) Prior Publication Data

US 2012/0284503 A1 Nov. 8, 2012

Related U.S. Application Data

(63) Continuation of application No. 13/024,941, filed on Feb. 10, 2011.

(51) Int. Cl.
*G06F 1/00* (2006.01)
(52) U.S. Cl.
USPC .......................................................... 713/340
(58) Field of Classification Search
USPC .................................. 713/300–340; 717/106
See application file for complete search history.

(56) References Cited

U.S. PATENT DOCUMENTS

| | | | | |
|---|---|---|---|---|
| 5,003,487 A * | 3/1991 | Drumm et al. | ................. | 716/104 |
| 5,038,296 A * | 8/1991 | Sano | ............................... | 706/45 |
| 5,787,294 A * | 7/1998 | Evoy | ............................. | 713/320 |
| 5,860,106 A * | 1/1999 | Domen et al. | ................. | 713/324 |
| 6,038,564 A * | 3/2000 | Sameshima et al. | .......... | 707/702 |
| 6,453,279 B1 * | 9/2002 | Prasad et al. | .................. | 702/189 |
| 6,470,290 B1 * | 10/2002 | Lee et al. | ...................... | 702/132 |
| 6,802,015 B2 * | 10/2004 | Atkinson | ...................... | 713/322 |
| 6,829,713 B2 * | 12/2004 | Cooper et al. | ................ | 713/320 |
| 6,952,782 B2 * | 10/2005 | Staiger | .......................... | 713/300 |
| 7,333,989 B1 * | 2/2008 | Sameshima et al. | .......... | 707/770 |
| 7,346,787 B2 * | 3/2008 | Vaidya et al. | ................. | 713/300 |

(Continued)

OTHER PUBLICATIONS

Madhu Saravana Sibi Govidan et al., "Using On-Line Power Modeling for Server Power Capping" Source: University of Texas at Austin and IBM; Publisher: www.research.ibm.com, 2009.

*Primary Examiner* — Paul R Myers
(74) *Attorney, Agent, or Firm* — Garg Law Firm, PLLC; Rakesh Garg; Libby Z. Toub

(57) ABSTRACT

A method for dynamic power and performance calibration of a data processing system is provided in the illustrative embodiments. A synthesized program loaded in the data processing system is executed responsive to detecting an event in the data processing system. The synthesized program is configured to generate a set of data that is indicative of the data processing system's power-performance characteristics under varying conditions of operation. Using the set of data, a determination is made of a performance limit on an operation of the data processing system under present operating conditions of the data processing system. A parameter of the data processing system is calibrated to operate the data processing system within the performance limit.

12 Claims, 5 Drawing Sheets

(56) References Cited

U.S. PATENT DOCUMENTS

| | | | |
|---|---|---|---|
| 7,434,072 B2 * | 10/2008 | Peirson et al. | 713/300 |
| 7,472,293 B2 * | 12/2008 | Kuhlmann et al. | 713/300 |
| 7,539,994 B2 * | 5/2009 | McAlinden et al. | 718/104 |
| 7,567,135 B2 * | 7/2009 | Rogers et al. | 331/48 |
| 7,721,069 B2 * | 5/2010 | Ramchandran et al. | 712/34 |
| 7,925,903 B2 * | 4/2011 | Varma et al. | 713/300 |
| 2003/0152143 A1 * | 8/2003 | Laurent | 375/229 |
| 2008/0126686 A1 * | 5/2008 | Sokolov et al. | 711/103 |
| 2008/0172398 A1 * | 7/2008 | Borkenhagen et al. | 707/100 |
| 2009/0112522 A1 | 4/2009 | Rasmussen | |
| 2009/0125293 A1 | 5/2009 | Lefurgy et al. | |
| 2009/0327656 A1 | 12/2009 | Baum et al. | |
| 2010/0011233 A1 | 1/2010 | Halepete et al. | |
| 2010/0070787 A1 | 3/2010 | Bieswanger et al. | |
| 2011/0022356 A1 | 1/2011 | Nussbaum et al. | |

* cited by examiner

FIG. 1
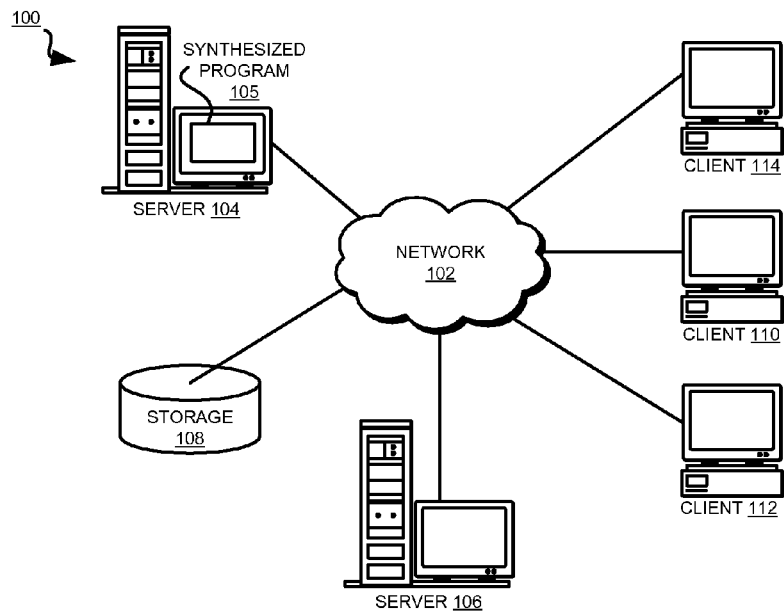
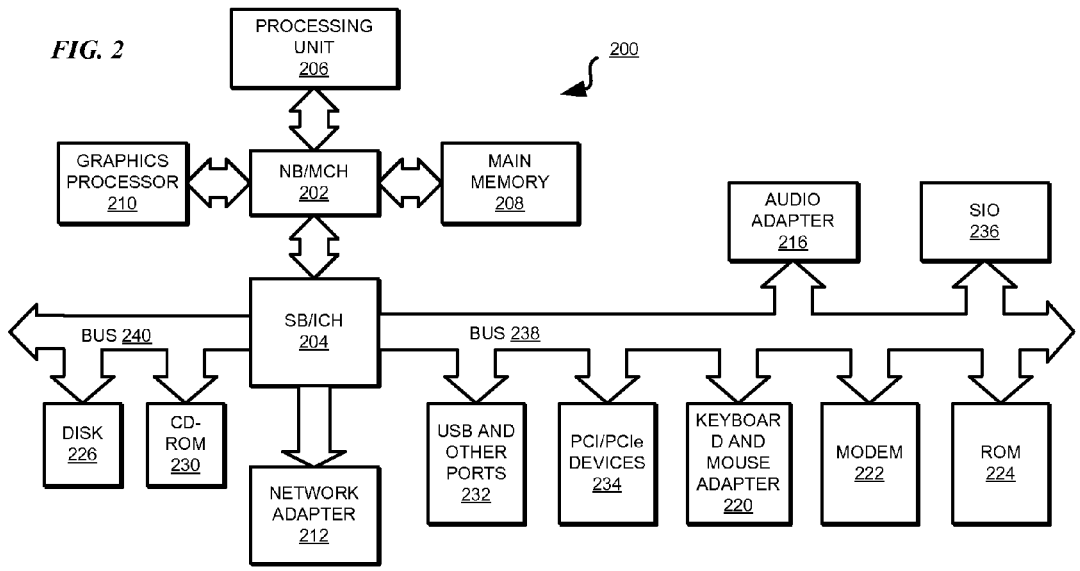

DYNAMIC POWER AND PERFORMANCE CALIBRATION OF DATA PROCESSING SYSTEMS

RELATED APPLICATION

The present application is a CONTINUATION of co-pending and commonly assigned U.S. patent application Ser. No. 13/024,941. The present invention is related to similar subject matter of co-pending and commonly assigned U.S. patent application Ser. No. 13/046,966 entitled "HARDWARE CHARACTERIZATION IN VIRTUAL ENVIRONMENTS," filed on Mar. 14, 2011, which is hereby incorporated by reference.

BACKGROUND

1. Technical Field

The present invention relates generally to a computer implemented method for efficiently operating a data processing system in a data processing environment. More particularly, the present invention relates to a computer implemented method for dynamic power and performance calibration of a data processing system for efficient operations under given operating circumstances.

2. Description of the Related Art

Data processing systems, such as server computers, are typically manufactured according to prescribed specifications. Once manufactured and tested, the data processing systems may then be deployed in a variety of configurations and circumstances.

Similarly configured data processing systems may be modified over time. For example, over time, different data processing systems of comparable specification may be reconfigured with new or different hardware, software, or both. A data processing system's performance and power are functions of the data processing system's configuration, components, and circumstances.

Furthermore, even seemingly identical electronic components, such as semiconductor devices, have differing power consumptions and performance characteristics. For example, channel widths, doping, and conductor insulation, exposure focus, and other similar aspects of a semiconductor device can vary slightly from one device to another even of the same wafer. Additionally, once installed and operational, the electrical properties of the semiconductor devices can vary over a period of use. For example, insulating layers can break down or begin to leak due to the heat produced in operation.

SUMMARY

The illustrative embodiments provide a method for dynamic power and performance calibration of data processing systems. An embodiment executes a synthesized program loaded in the data processing system responsive to detecting an event in the data processing system. The synthesized program is configured to generate a set of data that is indicative of the data processing system's power-performance characteristics under varying conditions of operation. The embodiment determines, using the set of data, a performance limit on an operation of the data processing system under present operating conditions of the data processing system. The embodiment calibrates a parameter of the data processing system to operate the data processing system within the performance limit.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which illustrative embodiments may be implemented;

FIG. 2 depicts a block diagram of a data processing system in which illustrative embodiments may be implemented;

DETAILED DESCRIPTION

Figure 3:
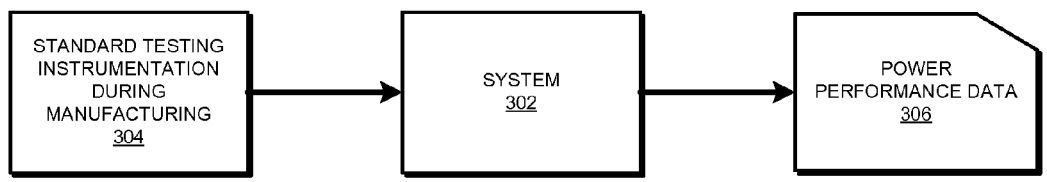
FIG. 3 depicts a block diagram of a power-performance data collection process that can be used in conjunction with an illustrative embodiment.

A data processing system (system) consumes electrical power to perform system operations. The nature of operations performed, time consumed to perform those operations, heat produced in performing those operations, and components activated for performing those operations are some example of a system's performance characteristics. A system's power-performance characteristic is a relationship between the power consumed and performance characteristics demonstrated under a given circumstance of time, place, and configuration.

The invention recognizes that different systems of similar configuration, model, capacity, and having similar components are not identical to one another. For example, even thought two microprocessors may be of the same make and model, their power consumption, temperature characteristics, and delays vary from chip to chip due to manufacturing process inaccuracies, characteristics of the materials used, differences in the manufacturing equipments at different production locations and times. Memory modules, disk drives, adapter cards, and other system components in similarly configured systems also exhibit different power and performance characteristics for similar reasons.

Additionally, the invention recognizes that a system's configuration may change over time causing the system's power consumption and performance characteristics to change accordingly. For example, a memory module may be replaced in a system resulting in a higher power draw for executing the same workload.

The invention also recognizes that electronic components also age over time and exhibit different power-performance characteristics at the same settings later in life as compared to when they are newly installed. For example, older electronic components typically exhibit increased leakage currents, older fans provide decreased cooling capacity, and older wiring exhibits weaker insulation causing increased power loss. Maximum achievable configuration range for system components may also change with age. For example, a processor may have a lower maximum turbo frequency later in its life than when newly installed.

Furthermore, the invention recognizes that a system tested in isolation as a stand-alone unit may exhibit one set of power-performance characteristics, and a different set of power-performance characteristics in a different configuration, such as in a rack including other systems. For example, a system executing a workload in a free-standing configuration may exhibit cooler temperatures and better performance as compared to the same system executing the same workload when surrounded by other heat producing systems in a rack.

The invention recognizes that presently available power-performance characteristics measuring techniques do not account for the above recognized variations and other similarly caused changes in a system's power-performance characteristics. For example, a system's power-performance characteristics determined tested at manufacturing are determined using the same instrumentation for all similarly configured systems. Furthermore, that measurement may not be applicable, relevant, or accurate as and where the system is deployed.

The invention further recognizes that even if a system's power consumption and various performance characteristics can be measured during operation, presently, they are not usable for dynamically calibrating the system's configuration or workload, the data processing environment's configuration, or adjusting a data processing environment's component's setting.

The illustrative embodiments used to describe the invention generally address and solve the above-described problems and other problems related to operational efficiencies of systems. The illustrative embodiments provide a method for dynamic power and performance calibration of data processing systems.

According to an embodiment of the invention, the power-performance characteristics of a system can be measured under certain circumstances, at certain events, during certain times, and in conjunction with certain operations (dynamically). The power-performance characteristics observed in this manner can then be modeled to predict or extrapolate the system's behavior limits and operational characteristics under certain conditions. Such a power-performance model according to an embodiment can then be used to calibrate the system, the data processing environment, or a combination thereof.

Power-performance calibrations and models according to an embodiment of the invention allow systems management to make decisions about how to set the system or systems in a configuration, such as a rack, to meet specific operational objectives. A system need not be taken offline to perform the power-performance measurements, modeling, or calibration.

An embodiment can also allow a closed-loop systems management scheme, whereby measurements result in calibration and calibrations trigger re-measurements, either continuously, periodically, or based on events. Furthermore, an embodiment can facilitate a priori configuration of a system for a future workload based on the power-performance model generated for the system.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include synthesized program 105 according to an embodiment. Synthesized program 105 may be constructed and used as described in this disclosure.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of a power-performance data collection process that can be used in conjunction with an illustrative embodiment. System 304 may be any data processing system, such as server 104 in FIG. 1.

At manufacturing or pre-deployment testing, system 302 may be subjected to standardized testing 304 for per-performance characteristics measurement. Data 306 generated from testing 304 indicates system 302's power consumption and performance characteristics under the standardized test conditions and criteria. For example, testing 304 may be designed to exercise the processor at various speeds and loads, the memory at various access rates and capacity, and the network adapter card at various throughputs and burst rates. Data 306 shows system 302's power consumption and performance measurements under the various test conditions of testing 304.

Figure 4:
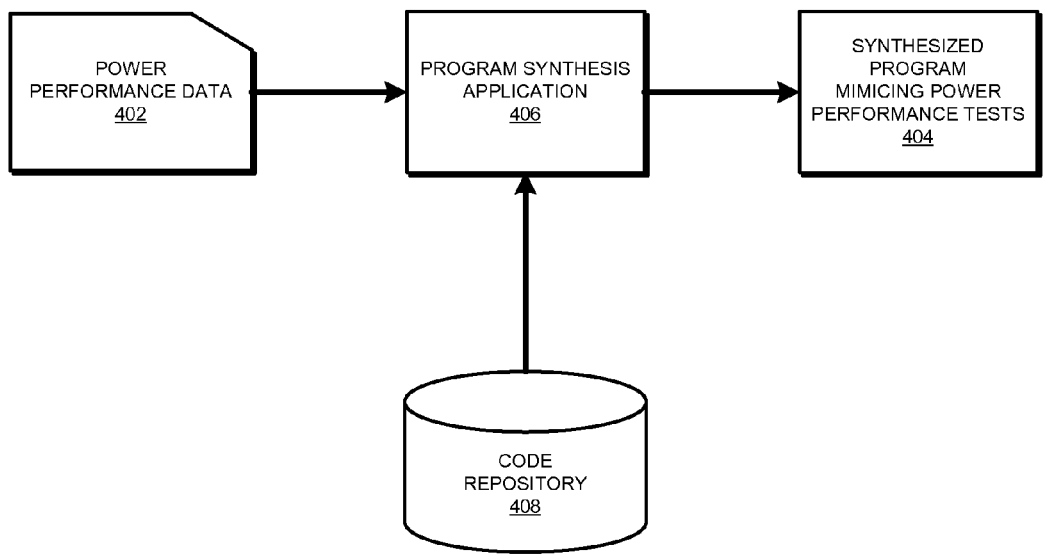
FIG. 4 depicts a block diagram of a program synthesis process in accordance with an illustrative embodiment.

With reference to FIG. 4, this figure depicts a block diagram of a program synthesis process in accordance with an illustrative embodiment. Power-performance data 402 is the same as power-performance data 306 in FIG. 3.

Synthesized program 404 may be used as synthesized program 105 in FIG. 1. Initially, synthesized program 404 may be program code that can be executed by a processor to cause the data processing system including the processor to exhibit power-performance characteristics as observed during testing 302 in FIG. 3.

Program synthesis application 406 may be an application to create synthesized program 404. In one embodiment, application 406 may be an automated code generation application that can generate code given the system exercising properties desired therein. In another embodiment, application 406 may be an application usable by a user to create code having the desired system exercising properties. For example, application 406 may generate or facilitate generating code for synthesized program 404 such that the code, when executed on a processor of a system causes the system to draw a range of power, for a range of operations or workloads, exercising a range of components of the system, for a pre-determined period.

Application 406 may utilize code repository 408 for synthesizing synthesized program 404. In one embodiment, repository 408 may be a repository of code segments, such as functions, methods, or subroutines, that demonstrate a particular power consumption behavior, performance characteristic, or both. For example, repository may contain one function that sends a threshold number of computing instructions to the processor. Another function may load a memory module to a threshold capacity, causing a number of page faults to exceed a threshold value. Another function may cause the total power draw of the system to be limited to a threshold value, while subjecting the processor to a number of instructions.

Generally, an initial version of synthesized program 404 attempts to match the relative frequency of events in underlying data 402. Multiple routines for different types of behavior—core-intensive, memory-intensive, or disk-intensive—can be incorporated into synthesized program 404. Synthesized program 404 executes across a range of power-performance settings to capture the dynamic behavior of the system as described in FIG. 5. Iterative refinement based on re-enforcement or dynamic programming can be performed on synthesized program 404, as described elsewhere in this disclosure.

Extracting a system's power-performance characteristics using synthesized program 404 in this manner enables exercising the system to exhibit a broader set of externally measurable characteristics, that possible with standardized testing. Performance factors such as power and temperature can be correlated to workloads. Synthesized program 404 can be executed across a range of loads for each different type of behavior, and the improved power-performance characteristics data observed using an embodiment can be used as a basis for load variability as in the system. Some example variability techniques can include timed sleeps and desynchronized timed sleeps on different hardware threads.

Repository 408 is an optional component in the depicted block diagram. For example, a user may use application 406, without using repository 408, to custom create a code segment that demonstrates a particular power consumption behavior, performance characteristic, or both.

Figure 5:
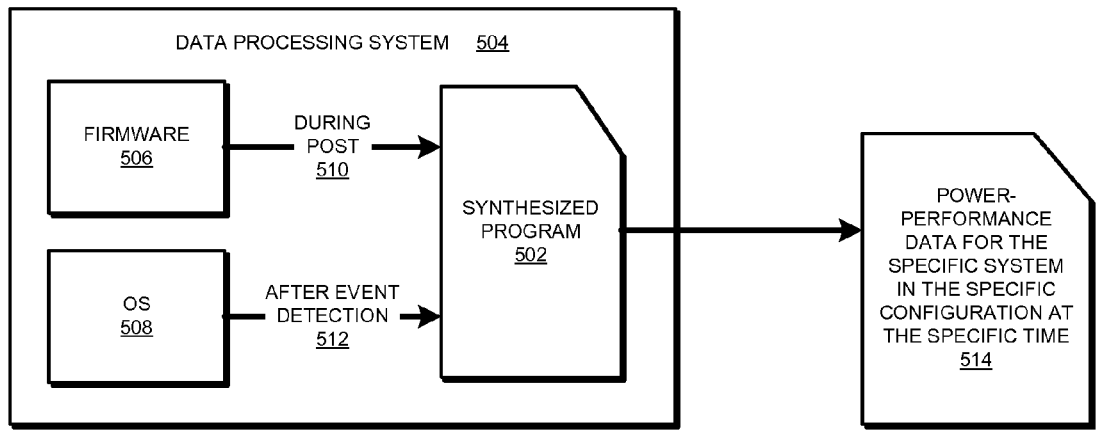
FIG. 5 depicts a block diagram of a synthesized program execution process in accordance with an illustrative embodiment.

With reference to FIG. 5, this figure depicts a block diagram of a synthesized program execution process in accordance with an illustrative embodiment. Synthesized program 404 in FIG. 4 can be used as 502. Data processing system 504 may be the data processing system for which synthesized program 502 has been created. Firmware 506 may be a component of data processing system 504 that initializes certain other components of data processing system 504 when data processing system 504 is powered up. Firmware 506 may also perform or cause to be performed, power-on self test (POST) on data processing system 504. Operating system 508 may be responsible for executing applications and performing operations on data processing system 504.

As an example of dynamic measurement of power and performance characteristics according to an embodiment, Firmware 506 may be configured to execute synthesized program 502 during POST 510. By executing synthesized program 502 in this manner, the power and performance data of data processing system 504 can be dynamically measured during the lifespan of data processing system 504. Repeated measurements, such as power and performance data measurements during several power-up phases over a period can then be modeled to understand the changing power-performance characteristics of data processing system 504.

As another example of the dynamic measurement, operating system 508 can trigger the execution of synthesized program 502 at any suitable time. For example, operating system 508 may detect an event, such as an off-line processor, a new memory module, a hot-swapped disk drive, a failed cooling fan, a changed workload, a particular process executing, a command received, a timer expiring, a change in ambient temperature, or any other kind of event in data processing system 504.

Operating system 508 may be configured to execute synthesized program 502 when a designated event is detected in data processing system 504. By executing synthesized program 502 in this manner, the power and performance data of data processing system 504 can be dynamically measured during the operation of data processing system 504. Repeated measurements, such as power and performance data measurements during operations over a period can then be modeled to understand the changing power-performance characteristics of data processing system 504.

Executing synthesized program 502 at POST, upon detecting events, or a combination thereof, outputs power and performance data 514. Data 514 is reflective of power consumption and performance behavior of data processing system 504 in specific configurations at specific times.

Figure 6:
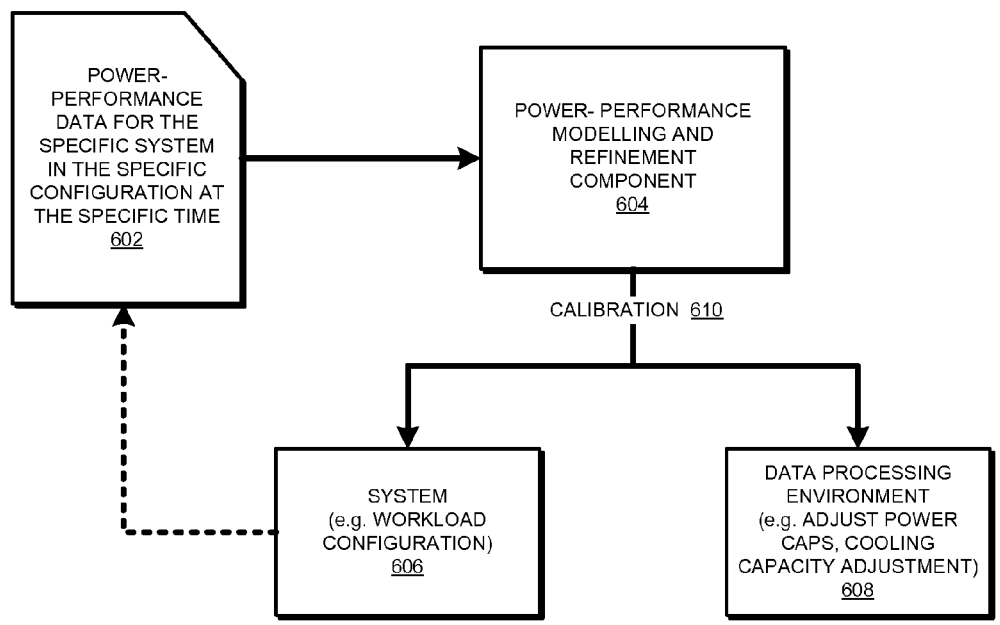
FIG. 6 depicts a block diagram of a dynamic power and performance modeling and calibration process in accordance with an illustrative embodiment.

With reference to FIG. 6, this figure depicts a block diagram of a dynamic power and performance modeling and calibration process in accordance with an illustrative embodiment. Data 602 is the same as data 514 in FIG. 5, and reflects the power-performance data for a specific system, such as data processing system 504 in FIG. 5, in a specific configuration at a specific time.

Data 602 forms an input to power-performance modeling and refinement component 604. Power-performance modeling and refinement component 604 may be an application executing in the same system to which data 602 pertains, or in a different system, such as an administration system. Many tools currently exist to create models from a set of data where the models can be used to predict or extrapolate behavior reflected within and outside of the set of data. Any such tool can be used in conjunction with data 602 to model power-performance characteristics of the given system, such as data processing system 504 in FIG. 5.

The refinement portion of power-performance modeling and refinement component 604 may be integrated with or separate from such a modeling tool. In other words, even though power-performance modeling and refinement component 604 is depicted as a single block in FIG. 6, the modeling function and the refinement function may be separately implemented within the scope of the invention.

The refinement portion of power-performance modeling and refinement component 604 may identify any calibration adjustments that may have to be made based on the changed power-performance characteristics observed in a model that its current at any given time. Note that such calibration determinations are dynamic because they result from a model, which is produced using data, which is collected dynamically during the operation of the data processing system over a period. The calibrations are dynamic also because they adjust parameters of system 606 or system 606's environment 608 while the system is deployed in the intended environment.

Power-performance modeling and refinement component 604, or the refinement portion thereof, sends calibration instructions 610 to system 606, system 606's data processing environment 608, or a combination thereof. Calibration instructions 610 are sent in response to the power-performance characteristics determined from the latest available model for system 606. For example, an instruction in calibration instructions 610 may reconfigure a workload planned to be executed on system 606. As another example, another instruction in calibration instructions 610 may adjust a power capacity limit (power cap) set for system 606 in data processing environment 608. A power cap may be a minimum value for the power cap or a maximum power cap. As another example, in order to reduce the ambient temperature in a rack where system 606 may be installed in data processing environment 608, another instruction in calibration instructions 610 may send a command to an air conditioning units to increase the unit's fan speed.

In one embodiment, upon responding to calibration instruction 610, system 606 may re-execute the synthesized program to collect new power and performance data in a feedback loop. System 606 may optionally also modify or trigger a modification of the synthesized program by changing, removing, or adding the code of the synthesized program.

Figure 7:
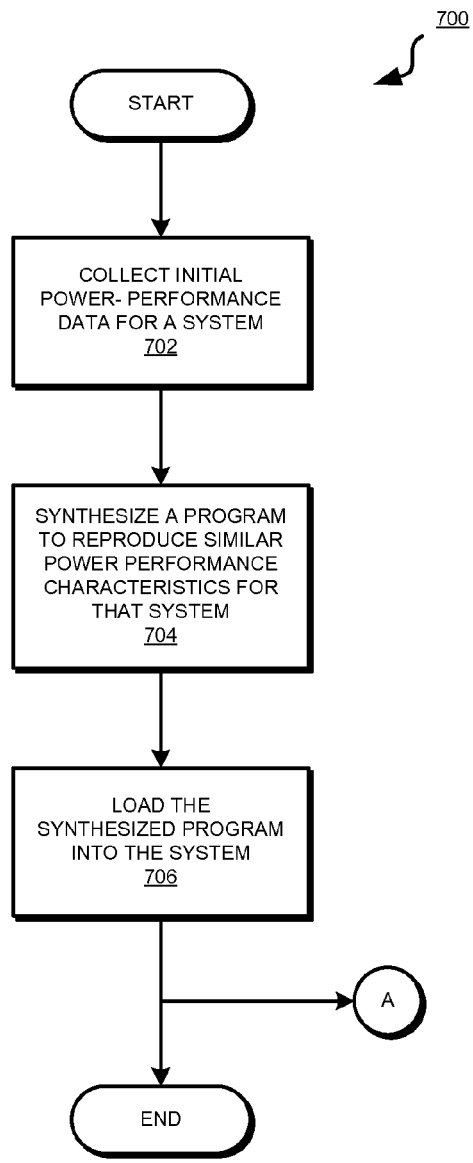
FIG. 7 depicts a flowchart of a process of enabling dynamic power and performance calibration of a data processing system in accordance with an illustrative embodiment.

With reference to FIG. 7, this figure depicts a flowchart of a process of enabling dynamic power and performance calibration of a data processing system in accordance with an illustrative embodiment. Process 700 can be implemented in an environment for initial configuration of a data processing system, such as a manufacturing facility. For example, process 700 may be implemented in an administration application in a manufacturing environment from where system testing and system configuration can be coordinated. Parts of process 700 may be implemented in but are not limited to program synthesis application 406 in FIG. 4.

Process 700 begins by collecting initial power and performance data for a system (step 702). Process 700 uses the data of step 702 to synthesize a program to reproduce the power-performance characteristics in the system that are reflected in the data of step 702 (step 704). Process 700 loads the synthesized program into the system for later execution (step 706). Process 700 may end thereafter, or exit via exit point marked "A" to enter another process—process 800 in FIG. 8—having a corresponding entry point marked "A".

Figure 8:
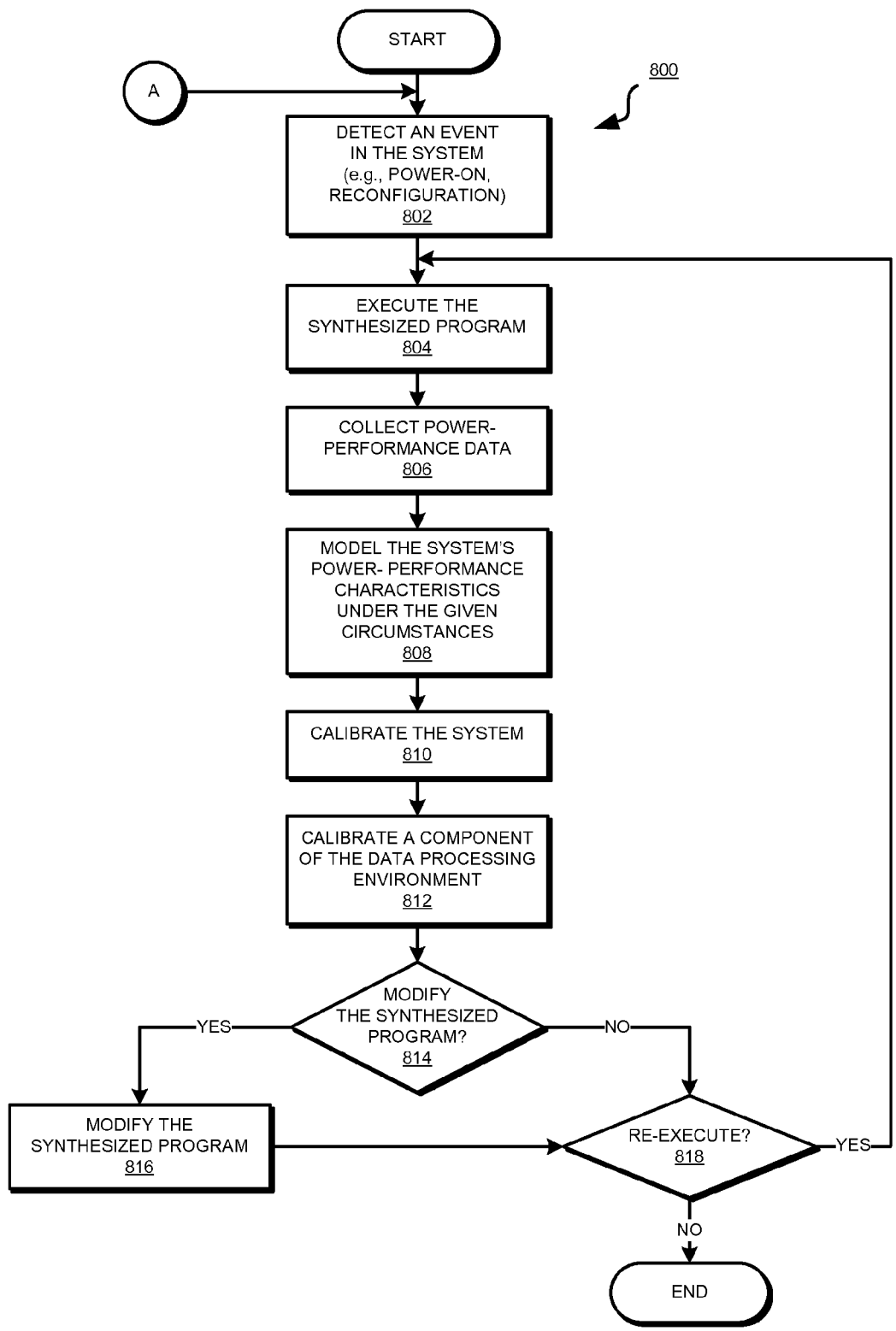
FIG. 8 depicts a flowchart of a process of dynamic power-performance calibration of a data processing system in accordance with an illustrative embodiment.

With reference to FIG. 8, this figure depicts a flowchart of a process of dynamic power-performance calibration of a data processing system in accordance with an illustrative embodiment. Process 800 can be implemented in a system being calibrated, such as system 504 where synthesized program 502 executes in FIG. 5. Without limitation, parts of process 800 can be implemented in different systems that collectively operate in a data processing environment.

Process 800 begins by detecting an event in the system (step 802). For example, the system may be powered on, causing a POST event, or the system may be reconfigured causing a different appropriate event to be detected in the system. Another process, such as process 700 in FIG. 7, can enter process 800 at entry point marked "A".

Process 800 executes the synthesized program (step 804). Process 800 collects the power-performance data from the execution (step 806).

Process 800 models the system's power-performance characteristics under the given circumstances when the power-performance data is collected in step 806 (step 808). Process 800 calibrates the system (step 810). Process 800 may alternatively, or in addition to step 810, calibrate a component of the data processing environment where the system may be operating (step 812). For example, process 800 may cause a fan to be turned on, a temperature setting to be adjusted, a power distribution equipment to be reconfigured, a power limit to be adjusted, or additional computing resources to be made available to the system.

These example calibrations of the system or the environment are included here only for the clarity of the description and are not intended to be limiting on the invention. Those of ordinary skill in the art will be able to appreciate that many more calibrations can be similarly effected on the system in question or the environment thereof.

Process 800 determines whether to modify the synthesized program (step 814). For example, at a certain point in time during the life of the system, previously modeled power-performance characteristics may become obsolete due to degradation of a component's characteristics below a threshold. In such a case, new code may be needed to test the component to a new lower threshold and not to a previously reachable threshold.

If the synthesized program has to be modified ("Yes" path of step 814), process 800 modifies the synthesized program code, such as from a code repository, custom coding, or a combination thereof (step 816). Process 800 proceeds to step 818. If the synthesized program need not be modified ("No" path of step 814), process 800 proceeds to step 818.

Process 800 determines whether to re-execute the synthesized program, such as to collect new power-performance data for the calibrated system, using modified synthesized program code, or a combination thereof (step 818). If the synthesized program should be re-executed ("Yes" Path of step 818), process 800 returns to step 804. If the synthesized program need not be re-executed ("No" Path of step 818), process 800 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for dynamic power and performance calibration of a data processing system. Using an embodiment of the invention, a system's power consumption and performance benchmarking can be performed dynamically at any time during the life of the system. An embodiment may allow for measuring and calibrating for a larger set of performance parameters than currently possible in standardized initial testing during the manufacturing process.

An embodiment can be used for improving a data processing environment's resource administration and management, such as by dynamically configuring or redirecting resource to/from the system based on the current power-performance characteristics of the system. An embodiment further enables measuring the power and performance of a system in the system's environment of deployment, such as in a rack. Presently available techniques for power-performance data generation only capture the state of the system when the system is operated in standardized environment, not the actual environment of deployment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for dynamic power and performance calibration of a data processing system, the method comprising:
    executing a synthesized program loaded in the data processing system responsive to detecting an event in the data processing system, the synthesized program configured to cause the data processing system to operate in varying conditions of operation and generate a set of data that is indicative of the data processing system's power-performance characteristics under varying conditions of operation, wherein operating in the varying conditions comprises matching a frequency of events found in data which is a basis for the synthesized program;
    predicting, using the set of data, a performance limit on an operation of the data processing system under a first set of operating conditions of the data processing system; and
    calibrating a parameter of the data processing system to operate the data processing system within the performance limit during the first set of operating conditions.

2. The computer implemented method of claim 1, further comprising:
    collecting an initial power-performance data for the data processing system, wherein the synthesized program is configured to cause the data processing system to exhibit a second behavior approximating a first behavior evident in the initial power-performance data; and
    loading the synthesized program into the data processing system.

3. The computer implemented method of claim 1, further comprising:
    creating a power-performance model using the set of data, wherein the performance limit is predicted from the power-performance model, and wherein the performance limit is different from a previous performance limit.

4. The computer implemented method of claim 1, wherein the calibrating is adjusting a planned workload on the data processing system.

5. The computer implemented method of claim 1, further comprising:
    modifying the synthesized program to test the operation of the data processing system up to the performance limit, wherein the performance limit is different from a previous performance limit.

6. The computer implemented method of claim 5, further comprising:
    re-executing the modified synthesized program to generate a new set of data that is indicative of the data processing system's power-performance characteristics under varying conditions of operation subject to the performance limit.

7. The computer implemented method of claim 1, further comprising:
    calibrating a parameter of a data processing environment within which the data processing system is executing.

8. The computer implemented method of claim 1, wherein the performance limit is a power limit.

9. The computer implemented method of claim 1, wherein the event is a power-on self test event.

10. The computer implemented method of claim 1, wherein the event is one of a workload reconfiguration event and a system reconfiguration event.

11. The computer implemented method of claim 1, wherein the operating in the varying conditions comprises using pre-determined data processing system components.

12. The computer implemented method of claim 1, wherein the operating in the varying conditions causes the data processing system to draw a pre-determined range of power.

* * * * *